(12) United States Patent
Onodera et al.

(10) Patent No.: US 8,596,797 B2
(45) Date of Patent: Dec. 3, 2013

(54) LIGHT SOURCE DEVICE AND PROJECTOR

(71) Applicant: Seiko Epson Corporation, Tokyo (JP)

(72) Inventors: Hiroshi Onodera, Matsumoto (JP); Takahiro Takizawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/782,634

(22) Filed: Mar. 1, 2013

(65) Prior Publication Data

US 2013/0222773 A1 Aug. 29, 2013

Related U.S. Application Data

(63) Continuation of application No. 12/578,983, filed on Oct. 14, 2009, now Pat. No. 8,408,714.

(30) Foreign Application Priority Data

Oct. 28, 2008 (JP) ................. 2008-276913

(51) Int. Cl.
*G03B 21/16* (2006.01)
*G03B 21/18* (2006.01)
*G03B 21/26* (2006.01)
*F21V 29/00* (2006.01)
*B60Q 1/06* (2006.01)

(52) U.S. Cl.
USPC ............. 353/61; 353/57; 362/294; 362/373

(58) Field of Classification Search
USPC ........ 353/52, 57–58, 60–61, 98–99; 362/264, 362/294, 345, 373
See application file for complete search history.

(56) References Cited

U.S. PATENT DOCUMENTS 6,497,489 B1 * 12/2002 Li et al. .................... 353/61
6,976,760 B2 12/2005 Ito et al.
(Continued)

FOREIGN PATENT DOCUMENTS

JP 2002-189247 A 7/2002
JP 2002-298639 A 10/2002
(Continued)

OTHER PUBLICATIONS

Non-Final Office Action received in U.S. Appl. No. 12/578,983; Mar. 1, 2012.
(Continued)

*Primary Examiner* — Tony Ko
*Assistant Examiner* — Jori S Reilly-Diakun
(74) *Attorney, Agent, or Firm* — ALG Intellectual Property, LLC

(57) ABSTRACT

In one embodiment, a light source device comprises a container with a duct unit disposed above an arc tube and extends along the center axis of light reflected by a reflection surface such that cooling air can flow in a direction opposite to the traveling direction of light reflected by the reflection surface. The duct unit includes a first opening disposed at a position shifted toward the traveling direction side from an opening end of the first reflection mirror, a wall portion which forms the edge of the first opening on the side opposite to the traveling direction side as a final end of the duct unit, and an inclined portion disposed in the vicinity of the edge of the first opening on the traveling direction side to bend the flowing direction of the cooling air toward an upper surface opposite to the surface having the first opening.

11 Claims, 11 Drawing Sheets

(56) References Cited

U.S. PATENT DOCUMENTS

| | | |
|---|---|---|
| 7,040,763 B2 | 5/2006 | Shiraishi et al. |
| 7,188,973 B2 | 3/2007 | Katsuma |
| 7,210,825 B2 | 5/2007 | Watanabe et al. |
| 7,513,626 B2 | 4/2009 | Adachi et al. |
| 7,934,839 B2 | 5/2011 | Noda |
| 8,011,788 B2 | 9/2011 | Chang |
| 2003/0076683 A1 | 4/2003 | Chang |
| 2005/0073841 A1 | 4/2005 | Imamura |
| 2006/0170876 A1* | 8/2006 | Takemi et al. .......... 353/61 |
| 2007/0115439 A1 | 5/2007 | Takezawa |
| 2011/0051098 A1 | 3/2011 | Kobayashi et al. |
| 2011/0216287 A1 | 9/2011 | Kitamura et al. |

FOREIGN PATENT DOCUMENTS

| | | |
|---|---|---|
| JP | 2005-010505 A | 1/2005 |
| JP | 2005-010505 A | 1/2005 |
| JP | 2005-116303 A | 4/2005 |
| JP | 2006-091132 A | 4/2006 |
| JP | 2006-106656 A | 4/2006 |

OTHER PUBLICATIONS

Final Office Action received in U.S. Appl. No. 12/578,983; Jun. 21, 2012.

Notice of Allowance and Notice of Allowability received in U.S. Appl. No. 12/578,983; Jan. 9, 2013.

* cited by examiner

LIGHT SOURCE DEVICE AND PROJECTOR

CROSS-REFERENCE

The present application is a continuation application of U.S. patent application Ser. No. 12/578,983 filed on Oct. 14, 2009, which claims priority from Japanese Patent Application No. 2008-276913 filed on Oct. 28, 2008, which are hereby incorporated by reference in their entirety.

BACKGROUND

1. Technical Field

The present invention relates to a light source device and a projector.

2. Related Art

A light source device and a projector which forms image light corresponding to image information by modulating light emitted from the light source device and projects the expanded image light on a projection surface such as a screen are known. A typical light source device of this type includes a discharge type arc tube such as extra-high pressure mercury lamp, and a reflection mirror for reflecting light emitted from the arc tube. In this case, the arc tube has high temperature at the time of light emission.

More specifically, the arc tube of the projector includes a substantially spherical light emission portion and a pair of sealing portions extending from both ends of the light emission portion in directions away from each other. The arc tube further includes light emission substance such as mercury sealed into the light emission portion. At the time of lighting of the arc tube having this structure, the temperature of the upper region of the light emission portion becomes the highest, and the temperature of the lower region becomes the lowest. When high temperature condition of the upper region of the light emission portion continues, devitrification is easily caused. Moreover, blacking is easily produced with increase in temperature difference between the upper region and the lower region. In this case, the arc tube easily deteriorates. Thus, the upper region of the arc tube needs to be cooled with high efficiency.

This type of projector is placed on an installation surface such as a desk in a normal position, or fixed to a ceiling or the like in a suspended position in the direction opposite to the normal position in the vertical direction. According to these installation positions, the area where heated air remains within the projector placed in the normal position is different from that area of the projector in the suspended position. Thus, in case of a structure including a flow path of cooling air for cooling the components of the projector as a path established before use, the light source device of the projector cannot be adequately cooled in the normal position or the suspended position depending on the installation condition. For overcoming this problem, a light source device capable of supplying cooling air to the upper region of the light emission portion by using an air direction changing plate rotatable by its own weight in both cases of the normal position and suspended position has been proposed (for example, see JP-A-2002-189247; FIG. 8).

According to the light source device disclosed in JP-A-2002-189247, cooling air for cooling the light emission portion is guided in a slightly downward direction by the air direction changing plate after flowing in a duct, and introduced into a reflection mirror (reflector) via air intake port and air supply hole. In this case, the cooling air cannot reach the arc tube with appropriate inclination, and thus cannot be adequately supplied to the upper region of the arc tube.

SUMMARY

It is an advantage of some aspects of the invention to provide a light source device and a projector capable of cooling an arc tube in an appropriate manner.

A light source device according to a first aspect of the invention includes: an arc tube having a light emission portion and a first sealing portion extending from one end of the light emission portion; a first reflection mirror attached to the first sealing portion and having a substantially concave surface for reflecting light emitted from the light emission portion; and a container which accommodates the arc tube and the first reflection mirror. The container has a duct unit disposed above the arc tube and extending along the center axis of light reflected by the reflection surface such that cooling air can flow in the direction opposite to the traveling direction of light reflected by the reflection surface. The duct unit includes a first opening open to the arc tube and disposed at a position shifted toward the traveling direction side from an opening end of the first reflection mirror, a wall portion which forms the edge of the first opening on the side opposite to the traveling direction side as a final end of the duct unit, and an inclined portion disposed in the vicinity of the edge of the first opening on the traveling direction side to bend the flowing direction of the cooling air toward the surface opposite to the surface having the first opening.

According to this structure, the flowing direction of cooling air flowing within the duct unit is bent toward the surface opposite to the surface having the first opening by the inclined portion provided in the vicinity of the first opening. Thus, the flowing direction of the cooling air is inclined to the flowing direction within the duct unit by the opposite side surface and the wall portion while the cooling air is flowing through the first opening open to the arc tube. By disposing the light emission portion in the flowing direction of the cooling air thus inclined, the cooling air flowing within the duct unit can be linearly supplied to the light emission portion.

Since the duct unit is provided above the arc tube, the cooling air flowing within the duct unit is supplied to the upper region of the light emission portion. In this case, the upper region of the light emission portion can be positively cooled, and temperature difference between the upper region and the lower region can be reduced. Thus, deterioration of the arc tube can be prevented.

Accordingly, the upper region of the arc tube can be adequately cooled, and the life of the arc tube can be increased.

It is preferable that the opening end of the first reflection mirror contacts the end surface of the wall portion on the side opposite to the traveling direction side.

According to this structure, the first opening and the opening end of the first reflection mirror are positioned close to each other. In this case, cooling air can be supplied to the upper region of the light emission portion linearly from a short distance compared with a structure in which the first opening and the opening end of the first reflection mirror are positioned away from each other. Accordingly, cooling air can be securely supplied to the upper region of the arc tube.

It is preferable that the arc tube has a second sealing portion extending from the end of the light emission portion opposite to the end from which the first sealing portion extends. The duct unit includes a branch portion having a second opening which branches apart of the cooling air flowing within the duct unit to guide the part of the cooling air to the second sealing portion.

According to this structure, the arc tube on the first sealing portion side can be cooled by cooling air flowing through the first opening, and the arc tube on the second sealing portion side can be cooled by cooling air flowing through the second opening. Thus, the entire area of the arc tube can be cooled, and the life of the arc tube can be further increased.

It is preferable that the arc tube has a second reflection mirror which covers the light emission portion on the light traveling direction side and reflects received light toward the first reflection mirror.

According to this structure, apart of light emitted from the light emission portion and not directly reaching the first reflection mirror is reflected by the second reflection mirror toward the first reflection mirror. Thus, utilization efficiency of light emitted from the light emission portion can be increased.

Even in the structure covering the light emission portion by the second reflection mirror, cooling air flowing through the first opening linearly flows downward as discussed above. Thus, the cooling air can reach the upper region of the light emission portion without flowing toward the second reflection mirror. Accordingly, the upper region of the light emission portion can be adequately cooled even in the structure including the second reflection mirror.

It is preferable that the duct unit includes: a first duct portion and a second duct portion disposed so as to be opposed to each other with the center of the arc tube interposed between the first and second duct portions, each of the first and second duct portions has the first opening, the wall portion, and the inclined portion; and a guiding member which directs the cooling air toward the first duct portion or the second duct portion positioned above the arc tube by moving by its own weight.

According to this structure, since cooling air can be supplied to the first duct portion or the second duct portion positioned above the arc tube by the guiding member shifting by its weight even when the container is reversely positioned in the up-down direction, cooling air can be directly supplied to the upper region of the light emission portion. Thus, the arc tube can be appropriately cooled when either the first duct portion or the second duct portion of the container is positioned above the arc tube.

A projector according to a second aspect of the invention includes: the light source device described above; a light modulation device which modulates light emitted from the light source device and forms image light; and a projection device which projects the image light.

According to this structure, the same advantages as those of the light source device described above are provided, and the life of the light source device as well as the life of the arc tube are increased. Thus, the necessity for frequently replacing the light source device can be eliminated, and the labor for maintenance can be reduced.

BRIEF DESCRIPTION OF THE DRAWINGS

The invention will be described with reference to the accompanying drawings, wherein like numbers reference like elements.

DESCRIPTION OF EXEMPLARY EMBODIMENT

Figure 1:
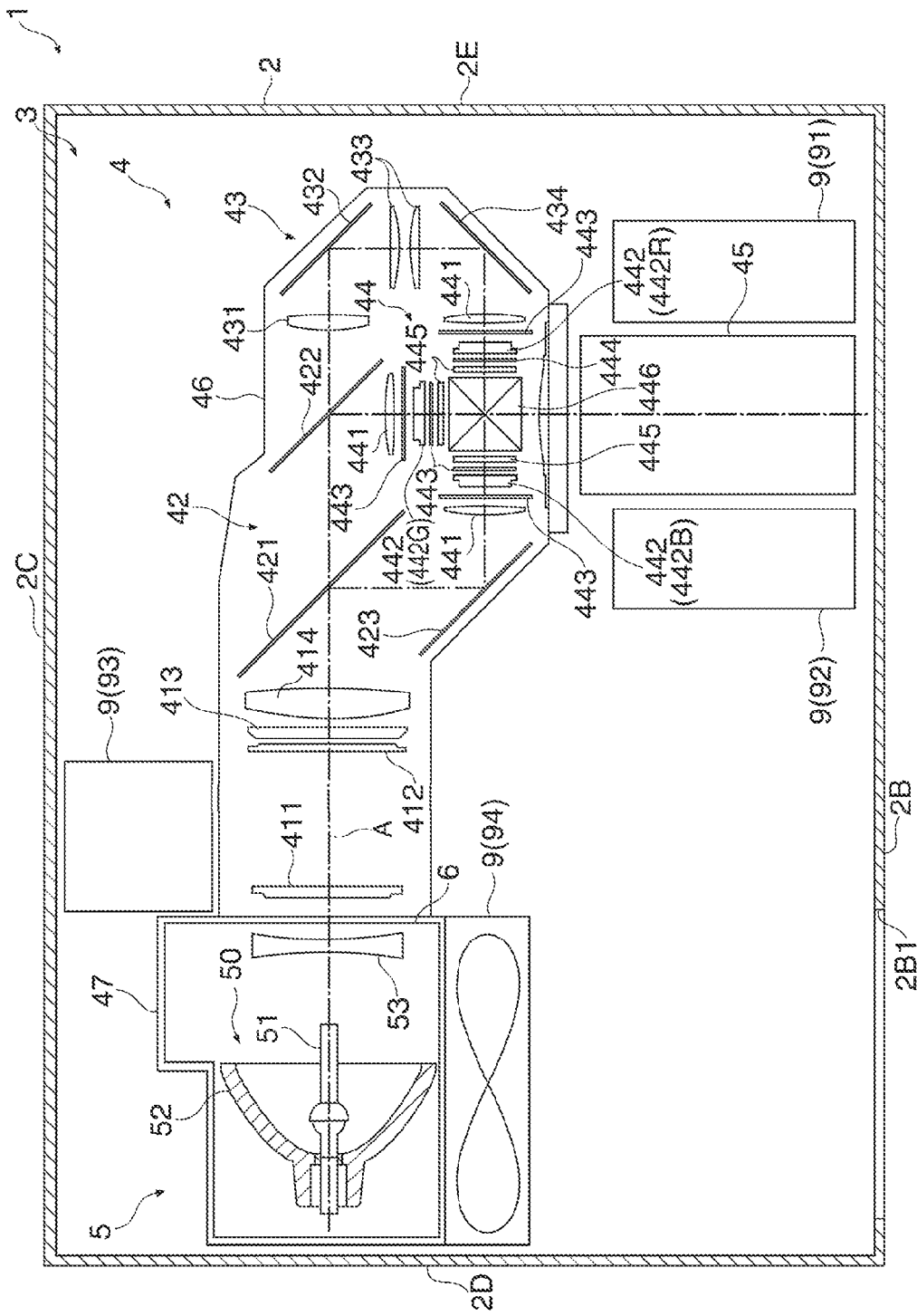
FIG. 1 schematically illustrates a structure of a projector according to an embodiment of the invention.

An embodiment according to the invention is hereinafter described with reference to the drawings.
Structure of Projector FIG. 1 schematically illustrates a structure of a projector 1 according to this embodiment.

The projector 1 forms image light according to image information by modulating light emitted from a light source device and projects the expanded image light on a projection surface (not shown) such as a screen. As illustrated in FIG. 1, the projector 1 includes a substantially rectangular outer housing 2 in the plan view, and a device main body 3 accommodated in the outer housing 2.

The outer housing 2 constitutes an upper surface (not shown), a front surface 2B, a back surface 2C, a left side surface 2D, a right side surface 2E, and a bottom surface (not shown) of the projector 1, and has not-shown plural legs attached to the bottom surface. The projector 1 is installed in a normal position by contact between the legs and an installation surface, and in a suspended position by attachment of the legs to the ceiling or the like in the direction opposite to that of the normal position in the vertical direction such that the bottom surface faces the ceiling or the like.

The device main body 3 includes an optical unit 4 and a cooling device 9. Though not shown in the figure, the device main body 3 further includes a power source device for supplying power to the respective components of the projector 1, a control device for controlling operations of the components of the projector 1, and others.

The cooling device 9 has a plurality of fans 91 through 94, and supplies air introduced from the outside of the outer housing 2 to the optical unit 4, the power source device, and the control device to cool these units. The pair of the fans 91 and 92 disposed with a projection device 45 described later interposed therebetween are sirocco fans for introducing outside cooling air through an intake port (not shown) formed on the outer housing 2 and supplying the cooling air to an optical device 44 described later.

As for the fans 93 and 94 disposed close to a light source device 5 described later, the fan 93 located on the back surface 2C side of the projector 1 is a sirocco fan which attracts air within the outer housing 2 and supplies the air to the light source device 5. The fan 94 is an axial fan which attracts air having cooled the light source device 5 and directs the air toward the front surface 2B of the projector 1 to discharge the air through a discharge port 2B1 formed on the front surface 2B. The fans 93 and 94 may be constituted by axial fan and sirocco fan, respectively. The discharge port 2B1 may be formed on any surface of the outer housing 2.

Structure of Optical Unit

The optical unit 4 forms image light according to image information under control of the control device. The optical unit 4 includes the light source device 5, an illumination device 41, a color separation device 42, a relay device 43, the optical device 44, the projection device 45, an optical component housing 46, and a light source container 47.

Figure 2:
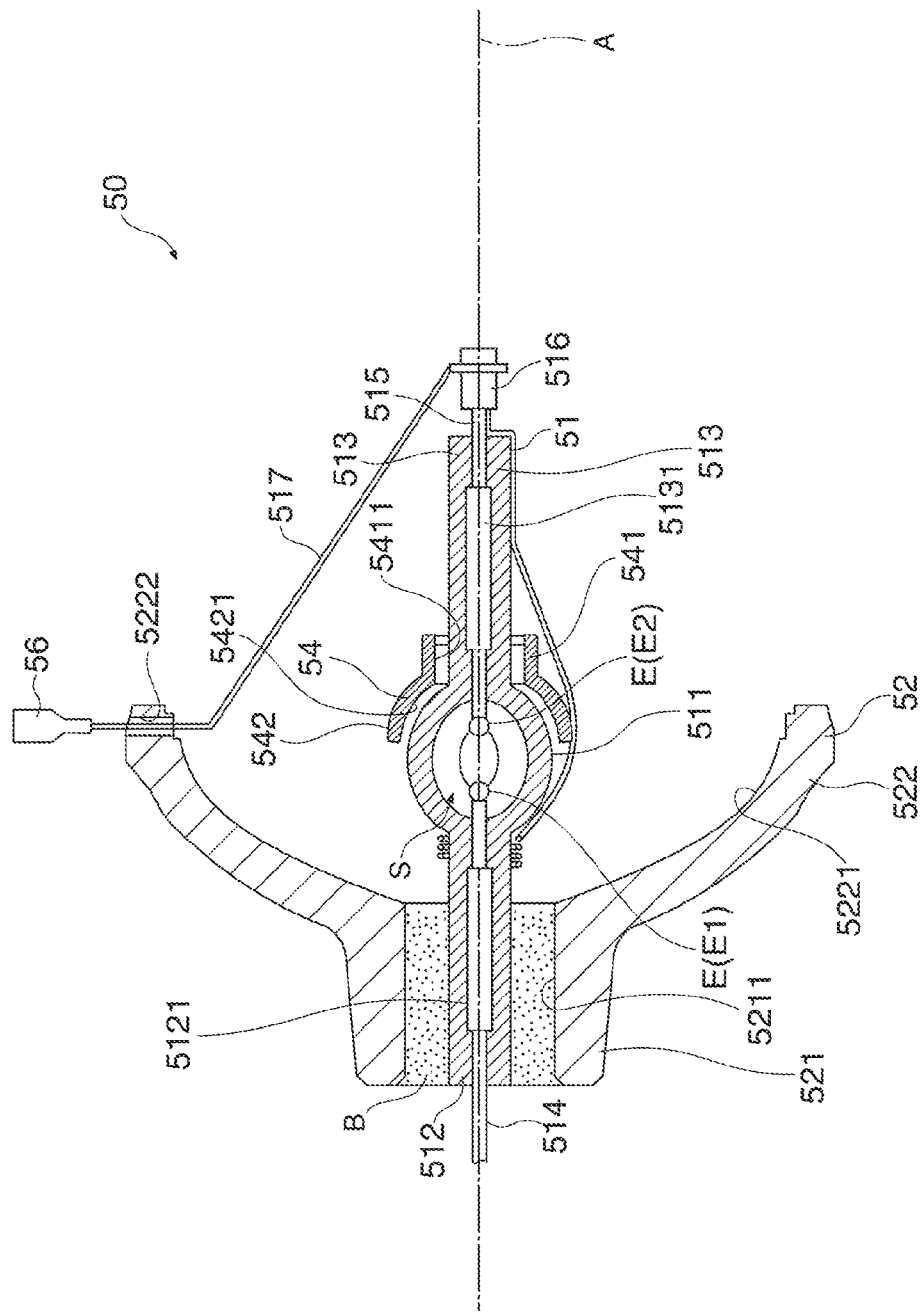
FIG. 2 is a cross-sectional view of a light source lamp according to the embodiment.

FIG. 2 is a cross-sectional view of a light source lamp 50.

The light source device 5 includes the light source lamp 50 having an arc tube 51 made of quartz glass and a main reflection mirror 52 attached to the arc tube 51, a collimating concave lens 53, and a container 6 for accommodating these components. The detailed structure of the container 6 will be described later.

As illustrated in FIG. 2, the arc tube 51 has a light emission portion 511 expanded in substantially spherical shape, and a pair of sealing portions 512 and 513 extended from both ends of the light emission portion 511 in directions away from each other with the light emission portion 511 interposed between the sealing portions 512 and 513 (sealing portion 512 on the main reflection mirror 52 side and sealing portion 513 on the side opposite to the main reflection mirror 52 in FIG. 2). The sealing portion 512 corresponds to a first sealing portion, and the sealing portion 513 corresponds to a second sealing portion in the appended claims.

A pair of electrodes E (E1 and E2) made from tungsten are provided inside the light emission portion 511. A discharge space S into which light emission substance containing mercury, rare gas, and a small amount of halogen is sealed is provided between the pair of the electrodes E1 and E2.

Metal foils 5121 and 5131 made of molybdenum electrically connected with the electrodes E1 and E2 are inserted into the pair of the sealing portions 512 and 513, respectively. The ends of the sealing portions 512 and 513 on the sides opposite to the light emission portion 511 are sealed by glass material or the like. Electrode extension lines 514 and 515 extended to the outside of the arc tube 51 are connected with the metal foils 5121 and 5131, respectively, such that the interior of the light emission portion 511 emits light when voltage is applied to the electrode extension lines 514 and 515.

A sub reflection mirror 54 as a second reflection mirror is fixed to the arc tube 51 such that light emitted from the light emission portion 511 toward the sealing portion 513 can be reflected toward the main reflection mirror 52 by the sub reflection mirror 54. The sub reflection mirror 54 has a substantially cylindrical neck-shaped portion 541 having an opening 5411 through which the sealing portion 513 is inserted, and a reflection portion 542 expanded from the neck-shaped portion 541.

The reflection portion 542 is disposed in such a position as to cover the light emission portion 511 on the sealing portion 513 side. The reflection portion 542 has a substantially concave shape in the cross-sectional view corresponding to the outer shape of the light emission portion 511 on the sealing portion 513 side. A reflection surface 5421 is formed on the surface of the reflection portion 542 opposed to the light emission portion 511. The reflection surface 5421 is provided as cold mirror for reflecting visible light and transmitting infrared light and ultraviolet light.

The main reflection mirror 52 corresponds to a first reflection mirror in the appended claims, which is a component integrally formed from glass for reflecting received light and converging the light at a focus position on an illumination optical axis A. The main reflection mirror 52 is fixed to the sealing portion 512 by adhesive B. The main reflection mirror 52 has a substantially cylindrical neck-shaped portion 521 having an opening 5211 into which the sealing portion 512 is inserted, and a reflection portion 522 having a concave surface and expanded from the neck-shaped portion 521.

A reflection surface 5221 on which metal thin film is evaporated is provided on the surface of the reflection portion 522 opposed to the light emission portion 511. The reflection surface 5221 reflects visible light and transmits infrared light and ultraviolet light as cold mirror.

While the main reflection mirror 52 is constituted by an ellipsoidal reflector having a spheroidal surface in this embodiment, the main reflection mirror 52 may be constituted by a parabolic reflector having a paraboloidal surface. In this case, the collimating concave lens 53 can be eliminated. Alternatively, the main reflection mirror 52 may be constituted by a free-curve surface reflector.

By attaching the sub reflection mirror 54 to the arc tube 51, light emitted from the light emission portion 511 to the side opposite to the main reflection mirror 52 (that is, sealing portion 513 side) can reach the reflection surface 5221 by reflection on the reflection surface 5421. Then, this light is further reflected by the reflection surface 5221 and converged similarly to the light directly reaching the reflection surface 5221 from the light emission portion 511. Thus, light not entering a lens array 411 (see FIG. 1) disposed after the light source device 5 on the optical path can be reduced.

A trigger line 55 is an auxiliary starting line for improving lighting capability of the arc tube 51. One end of the trigger line 55 is wound around the sealing portion 512 in coil shape, the intermediate portion of the trigger line 55 is disposed along the outer sides of the emission portion 511, the sub reflection mirror 54 and the sealing portion 513, and the other end is connected with the electrode extension line 515 via a connecting member 516. One end of a lead 517 extended to the outside of the main reflection mirror 52 via an insertion hole 5222 formed in the vicinity of the edge of the reflection portion 522 is connected with the connecting member 516. The other end of the lead 517 is connected with a terminal 56 for applying voltage to the electrode extension line 515 and the trigger line 53.

In this structure, the lighting capability of the arc tube 51 can be increased by applying high pressure pulse voltage to the trigger line 55 thus provided.

Returning to FIG. 1, the illumination device 41 includes a pair of lens arrays 411 and 412, a polarization conversion element 413, and a superimposing lens 414.

The color separation device 42 includes dichroic mirrors 421 and 422, and a reflection mirror 423. The relay device 43 includes an entrance side lens 431, relay lenses 433, and reflection mirrors 432 and 434.

The optical device 44 includes field lenses 441, three liquid crystal panels 442 as light modulation devices (liquid crystal panel 442R for red light, liquid crystal panel 442G for green light, and liquid crystal panel 442B for blue light), three entrance side polarization plates 443, three visibility angle compensating plates 444, three exit side polarization plates 445, and a cross dichroic prism 446 as color combining device.

The projection device 45 is constituted by a combination of plural lenses accommodated in a cylindrical lens barrel, and expands image light formed by the optical device 44 to project the expanded image light on the projection surface.

The optical component housing 46 is a box-shaped housing having substantially L shape for containing the respective optical devices 41 through 44 discussed above. The optical component housing 46 accommodates the respective optical devices 41 through 44 at predetermined positions with respect to the illumination optical axis A established inside the optical component housing 46.

The light source container 47 connected with one end of the optical component housing 46 accommodates the light source device 5.

According to the optical unit 4 having this structure, lights emitted from the light source device 5 are converted into lights having uniform illuminance within the illumination area by the illumination device 41, and then separated into three color lights in R (red), G (green), and B (blue) by the color separation device 42. The respective color lights thus separated are modulated by the corresponding liquid crystal panels 442 according to image information to form image lights in respective colors. Then, the image lights in respective colors are combined by the cross dichroic prism 446, and expanded and projected on the projection surface by the projection device 45.

Structure of Container

Figure 3:
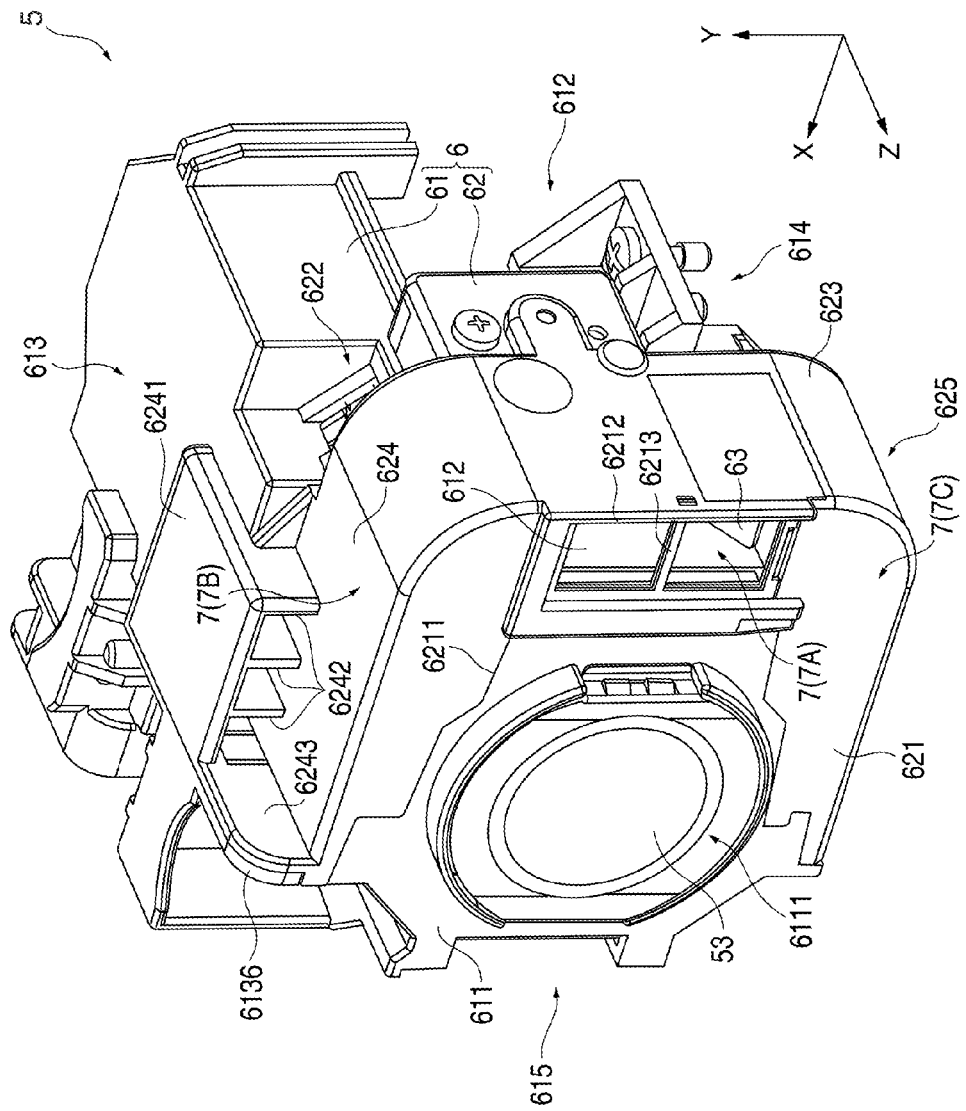
FIG. 3 is a perspective view of a light source device according to the embodiment.
Figure 4:
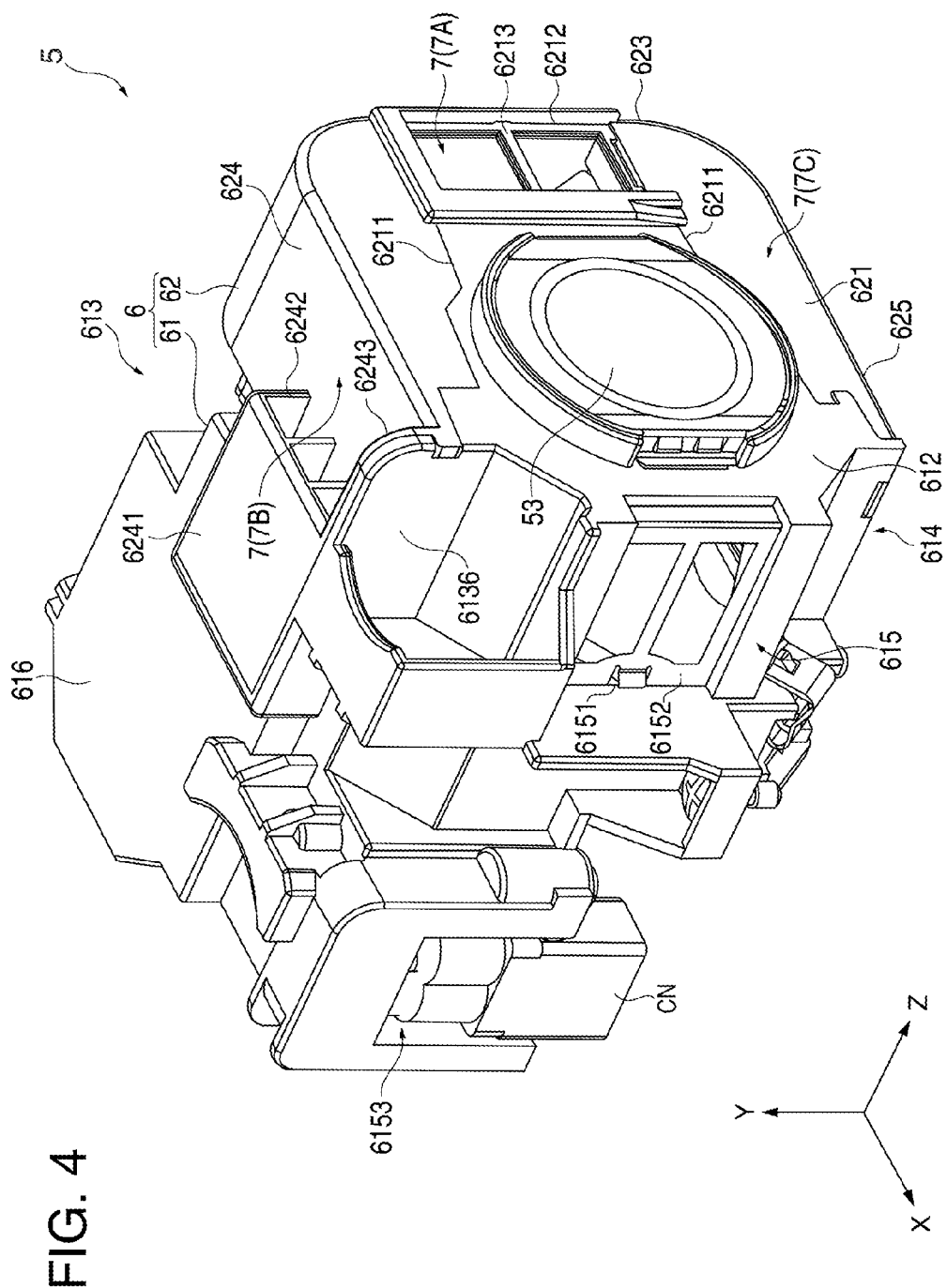
FIG. 4 is a perspective view of the light source device according to the embodiment.
Figure 5:
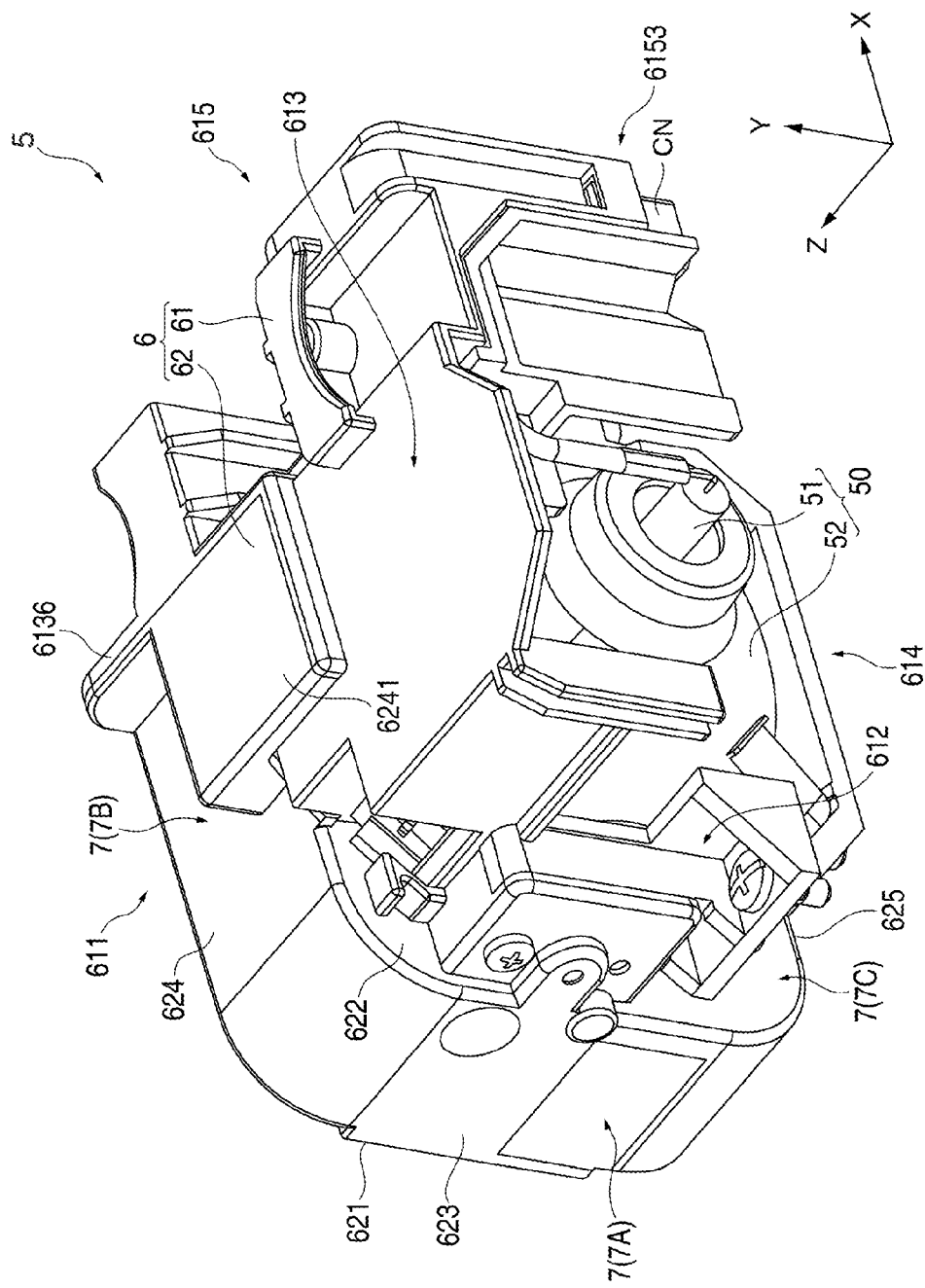
FIG. 5 is a perspective view of the light source device according to the embodiment.

FIGS. 3 through 5 are perspective views showing the light source device 5. More specifically, FIGS. 3 and 4 are perspective views on the light emission side of the light source device 5 on the right side and the left side, respectively. FIG. 5 is a perspective view of the light source device 5 on the opposite side of the light emission side. In the following description and the attached drawings, the light emission direction of the light source device 5 (more specifically, main reflection mirror 52 described later in detail) as a direction extending in the horizontal direction when the projector 1 is placed on a horizontal plane in the normal position corresponds to Z direction. In this case, the light emission side in the Z direction is the front side, and the side opposite to the light emission side is the back side. The direction orthogonal to the Z direction and extending in the horizontal direction and in the left direction as viewed from the light emission side (front side) in the Z direction corresponds to X direction. The right side in the X direction is the right surface side, and the left side in the X direction is the left surface side. The direction orthogonal to the Z direction and X direction and extending upward corresponds to Y direction. The upper side in the Y direction is the upper surface side, and the lower side in the Y direction is the bottom surface side. Thus, the respective directions X, Y, and Z cross one another at right angles.

As explained above, the light source device 5 is a unit including the light source lamp 50, the collimating concave lens 53 (see FIG. 1 for both), and the container 6 for accommodating these components.

The container 6 is made of synthetic resin containing glass filler. As illustrated in FIGS. 3 through 5, the container 6 has a container main body 61, a duct member 62 for covering the container main body 61 on the light emission side in the Z direction and the right side in the X direction, a guiding plate 63 (FIG. 3) provided within the duct member 62 and rotating by its own weight, and a supporting member 64 (see FIG. 7) for supporting the guiding plate 63. The container 6 further includes a duct unit 7 having a branch portion 7A for branching cooling air introduced from the outside of the light source device 5 by using the outer surface of the container main body 61 and the inner surface of the duct member 62, and a first duct portion 7B and a second duct portion 7C each of which introduces the branched cooling air to the light emission portion 511 when the projector 1 is installed in the normal position or the suspended position. The detailed structure of the duct unit 7 will be described later.

Structure of Container Main Body

Figure 6:
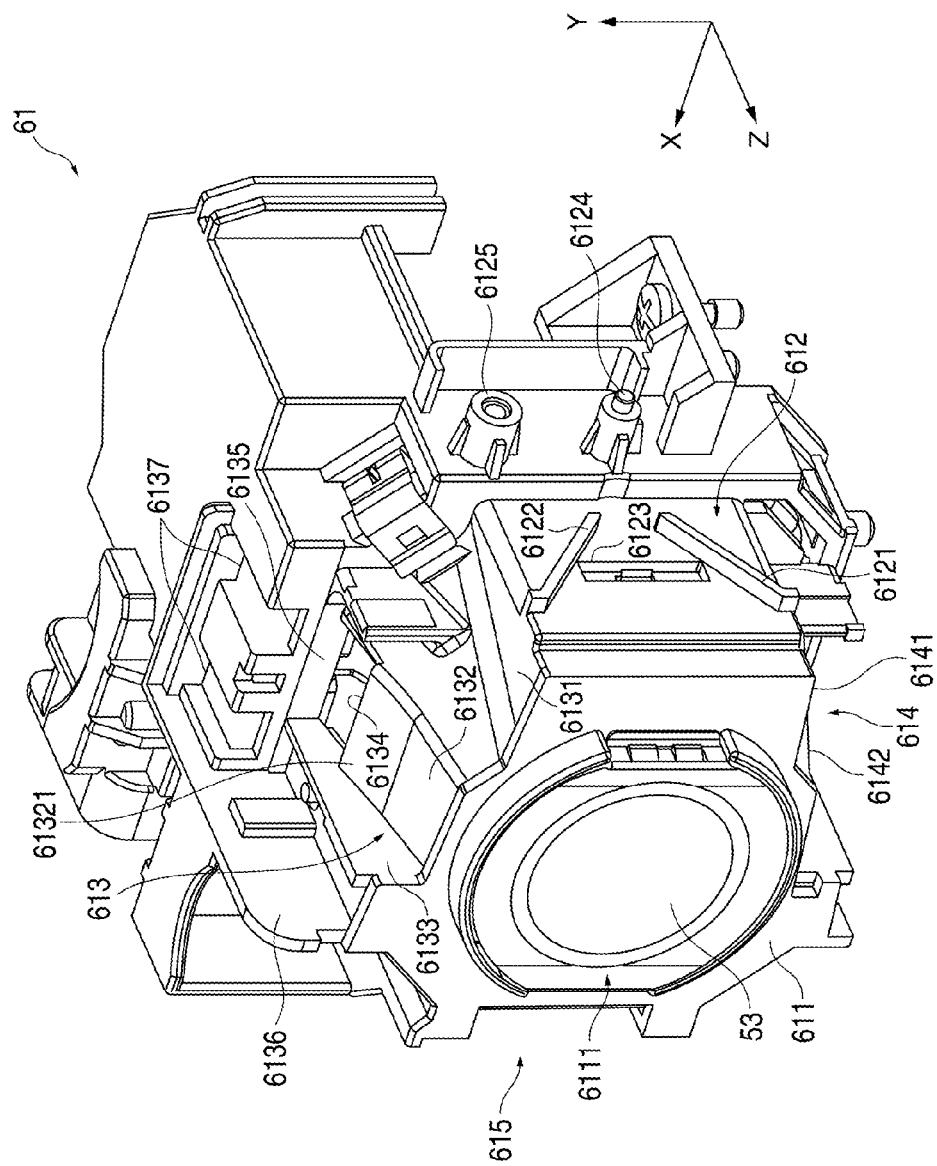
FIG. 6 is a perspective view of a container main body according to the embodiment.

FIG. 6 is a perspective view of the container main body 61. More specifically, FIG. 6 is a perspective view showing the condition of the container main body 61 from which the duct member 62 shown in FIG. 3 is removed.

As illustrated in FIG. 6, the container main body 61 has a cylindrical shape constituted by a front surface 611, a right side surface 612, an upper surface 613, a lower surface 614, and a left side surface 615. A lamp container 616 (see FIG. 8) for accommodating the light source lamp 50 is formed inside the respective surfaces 611 through 615. As illustrated in FIG. 5, the main reflection mirror 52 to which the arc tube 51 is fixed is inserted into the lamp container 616 from the side opposite to the light emission side in the Z direction.

A substantially circular opening 6111 through which light emitted from the light source lamp 50 passes is formed on the front surface 611. The collimating concave lens 53 is fitted to the opening 6111.

The area of the right side surface 612 on the light emission side in the Z direction forms the branch portion 7A when combined with the duct member 62. As illustrated in FIG. 6, a pair of rotation regulating members 6121 and 6122 (rotation regulating member 6121 on the lower side in the Y direction and rotation regulating member 6122 on the upper side in the Y direction) for regulating rotation of the guiding plate 63 described later project from the right side surface 612 to the outside. The ends of the rotation regulating members 6121 and 6122 on the side opposite to the light emission side in the Z direction are disposed close to each other, and the opposite ends on the light emission side in the Z direction are disposed away from each other, providing inclination of the rotation regulating members 6121 and 6122 at the same angle with respect to the Z direction.

A slit-shaped opening 6123 extending in the Y direction is formed between the rotation regulating members 6121 and 6122. The opening 6123 penetrating through the right side surface 612 corresponds to a second opening in the appended claims. Thus, a part of cooling air introduced into the duct member 62 is guided into the lamp container 616 (see FIG. 8) to cool the arc tube 51 on the sealing portion 513 side accommodated in the lamp container 616.

A pair of bosses 6124 and 6125 projecting to the outside of the surface are provided on the right side surface 612 on the side opposite to the light emission side in the Z direction. The boss 6124 on the lower side in the Y direction is a positioning member for positioning the duct member 62. The boss 6125 on the upper side in the Y direction is a fixing member into which a screw for fixing the duct member 62 is screwed.

The area of the upper surface 613 on the light emission side in the Z direction forms the first duct portion 7B when combined with the duct member 62. This area has a stepped portion 6131 on the right side in the X direction, which is lower than the substantially center area of the upper surface 613. This area also has an inclined portion 6132 substantially at the center in the X direction, which is inclined upward in the Y direction toward the side opposite to the light emission side in the Z direction. A curved portion 61321 curved upward in the Y direction toward the side opposite to the light emission side in the Z direction is formed at the end of the inclined portion 6132 on the side opposite to the light emission side in the Z direction.

A standing portion 6133 standing to the outside of the upper surface 613 is provided on the inclined portion 6132 on the left side in the X direction. A substantially rectangular opening 6134 as a first opening is formed on the inclined portion 6132 on the side opposite to the light emission side in the Z direction. A wall portion 6135 extending in the X direction and Y direction is provided on the opening 6134 on the side opposite to the light emission side in the Z direction. The edges of the opening 6134 on the light emission side and the opposite side in the Z direction and the left side in the X direction are formed by the inclined portion 6132, the standing portion 6133, and the wall portion 6135.

A standing portion 6136 extending in the Z direction and standing toward the upper side in the Y direction is provided on the standing portion 6133 on the left side in the X direction. The standing portion 6136 contacts a standing portion 6243 of the duct member 62 described later.

A pair of openings 6137 disposed in the X direction are formed on the wall portion 6135 on the side opposite to the light emission side in the Z direction to introduce cooling air for cooling the outer circumference of the main reflection mirror 52 via the openings 6137.

A stepped portion 6141, an inclined portion 6142, a standing portion 6143, an opening 6144, and a wall portion 6145 (see FIG. 8) similar to the stepped portion 6131, the inclined portion 6132, the standing portion 6133, the opening 6134, and the wall portion 6135 are provided on the lower surface 614 opposite to the upper surface 613 to form the second duct portion 7C when the container main body 61 and the duct member 62 are combined.

As illustrated in FIG. 4, a substantially rectangular opening 6151 for discharging cooling air having cooled the light source lamp 50 in the lamp container 616 is formed on the left side surface 615 on the light emission side in the Z direction. The opening 6151 is located at a position shifted on the light emission side in the Z direction from the main reflection mirror 52. A frame member 6152 having a mesh is attached to the inside of the opening 6151 so as to prevent scattering of fragments of the arc tube 51 when the arc tube 51 is broken.

A connector container 6153 concaved to the inside is provided on the left side surface 615 on the side opposite to the light emission side in the Z direction. A connector CN connected with the terminal 56 and the electrode extension line 514 is attached to the inside of the connector container 6153.

Structure of Duct Member

Figure 7:
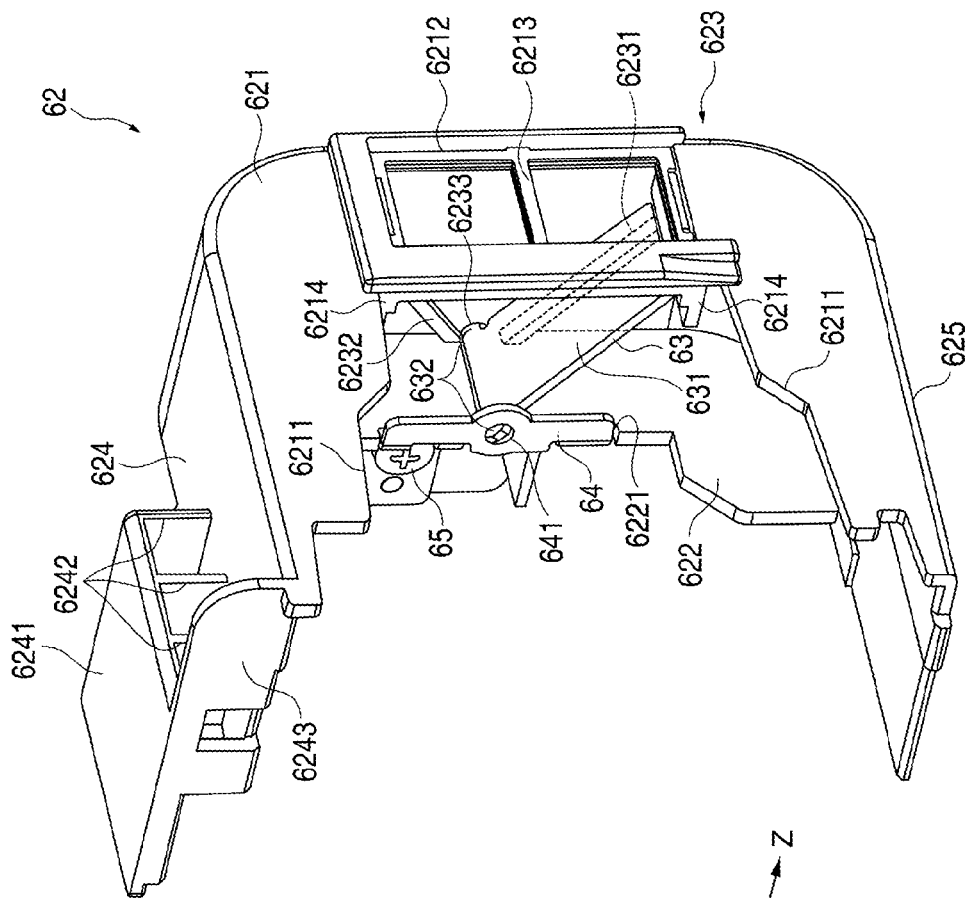
FIG. 7 is a perspective view of a duct member according to the embodiment.

FIG. 7 is a perspective view of the duct member 62.

The duct member 62 is attached to the container main body 61 by screw or the like to form the duct unit 7 by using the right side surface 612, the upper surface 613, the lower surface 614 of the container main body 61 (see FIG. 6), and the inner surface of the duct member 62. As illustrated in FIG. 7, the duct member 62 has substantially C shape opened on the left side in the X direction as viewed on the side opposite to the light emission side in the Z direction. The duct member 62 having this structure has a front surface 621, a back surface 622, a right side surface 623, an upper surface 624, and a bottom surface 625. When the duct member 62 is attached to the container main body 61, the right side surface 623, the upper surface 624, and the bottom surface 625 are located opposed to the right side surface 612, the upper surface 613, and the lower surface 614, respectively.

The front surface 621 has a notch 6221 shaped to agree with the external shapes of the respective surfaces 612, 613, and 614. Thus, the front surface 621 and the front surface 611 have the same level.

A substantially rectangular introduction opening 6212 whose longitudinal direction corresponds to the Y direction is formed on the front surface 621 on the right side in the X direction. The introduction opening 6212 is connected with a delivery opening of the cooling fan 93 (see FIG. 1) to introduce cooling air delivered from the cooling fan 93 into the duct member 62. A frame member 6213 having a mesh is fitted to the inside of the introduction opening 6212 to prevent scattering of fragments of the arc tube 51 similarly to the frame member 6152.

Projecting portions 6214 projecting to the outside of the surface from the edges of the introduction opening 6212 on the lower side and the upper side in the Y direction are provided on the area of the front surface 621 on the side opposite to the light emission side in the Z direction. The end of the guiding plate 63 rotatable by its weight contacts one of the projecting portions 6214.

The back surface 622 faces the front surface 621 in the outside of the container main body 61 and constitutes a part of the branch portion 7A and each of the duct portions 7B and 7C together with the front surface 621 and the right side surface 623 when the duct member 62 is attached to the container main body 61.

On the edge of the back surface 622 on the upper side in the X direction, a concave portion 6211 to which the supporting member 64 for pivotally supporting the guiding plate 63 is attached is formed.

A pair of rotation regulating members 6231 and 6232 (rotation regulating member 6231 on the lower side in the Y direction and rotation regulating member 6232 on the upper side in the Y direction) having similar shapes as those of the pair of the rotation regulating members 6121 and 6122 project from the inner surface of the right side surface 623 (surface on the left side in the X direction) at the positions corresponding to the positions of the rotation regulating members 6121 and 6122. A substantially circular concave portion 6233 is formed between the rotation regulating members 6231 and 6232 at the position where the rotation regulating members 6231 and 6232 come closest to each other. An extending portion 632 as the rotation axis of the guiding plate 63 described later is inserted into the concave portion 6233. A screw hole (not shown) into which a screw 65 for fixing the supporting member 64 is screwed is formed on the inner surface of the right side surface 623 on the side opposite to the light emission side in the Z direction.

The upper surface 624 covers the stepped portion 6131, the inclined portion 6132, the standing portion 6133, the opening 6134, and the wall portion 6135 formed on the upper surface 613. In this case, the area of the upper surface 624 on the lower side in the Y direction, the edge of the standing portion 6133 on the upper side in the Y direction, and the edge of the wall portion 6135 on the light emission side in the Z direction contact one another to form the first duct portion 7B by the upper surface 624, the upper surface 613, the front surface 621, and the back surface 622.

A projecting portion 6241 projecting toward the upper side in the Y direction is formed on the upper surface 624. Openings 6242 through which cooling air flows to the outer circumference of the main reflection mirror 52 contained in the lamp container 616 via the openings 6137 are formed on the projecting portion 6241. However, the openings 6242 do not communicate with the first duct portion 7B, and the flow path for cooling air flowing through the openings 6242 is separated from the flow path for cooling air flowing within the first duct portion 7B.

A standing portion 6243 standing toward the upper side in the Y direction is provided on the upper surface 624 on the upper side in the X direction. The standing portion 6243 contacts the standing portion 6136 provided on the upper surface 613 to dispose the duct member 62 at an appropriate position with respect to the container main body 61.

A metal plate-shaped member 624A1 (see FIG. 10) is attached to an inner surface (surface on the lower side in the Y direction) of the upper surface 624 at the position corresponding to the opening 6134 when the duct member 62 is attached to the container main body 61. The plate-shaped member 624A1 prevents deterioration of the incident position of light when light emitted from the light emission portion 511 is directly incident on the upper surface 624 via the opening 6134.

The bottom surface 625 is substantially flat, and covers the stepped portion 6141, the inclined portion 6142, the standing portion 6143, the opening 6144, and the wall portion 6145 formed on the lower surface 614 by attachment of the duct member 62 to the container main body 61 similarly to the upper surface 624 to form the second duct portion 7C by the bottom surface 625, the lower surface 614, the front surface 621, and the back surface 622 inside these surfaces. A metal plate-shaped member 625A1 (see FIG. 10) is attached to an inner surface 625A of the bottom surface 625 at the position corresponding to the opening 6144.

Structure of Guiding Plate

The guiding plate 63 corresponds to a guiding member in the appended claims. As explained above, the guiding plate 63 disposed within the branch portion 7A rotates by its weight within the range from the rotation regulating members 6121 and 6231 to the rotation regulating members 6122 and 6232 to change the flowing direction of a part of cooling air introduced through the introduction opening 6212 toward the first duct portion 7B or the second duct portion 7C. The guiding plate 63 is a plate-shaped member which has a guiding portion 631 positioned at the center and extending portions 632 disposed at one end of the guiding portion 631 and extending in the direction away from each other.

One of the extending portions 632 is inserted into the concave portion 6233, and the other extending portion 632 is inserted into a hole 641 formed on the supporting member 64. The guiding plate 63 is supported by the supporting member 64 fixed to the screw hole formed on the right side surface 623 in such a manner as to be rotatable around the extending portions 632 as rotation axis.

The guiding portion 631 is a component for changing the flowing direction of cooling air upward. When the guiding plate 63 rotates by its weight, the guiding portion 63 contacts the rotation regulating members positioned on the upper side in the vertical direction (rotation regulating members 6121 and 6231 in the normal position and rotation regulating members 6122 and 6232 in the suspended position of the projector 1), and also contacts the projecting portion 6214 positioned on the upper side in the vertical direction. By this method, the flowing direction of a part of the cooling air introduced through the introduction opening 6212 is changed to the upward direction. Other cooling air is introduced into the lamp container 616 via the opening 6123 (see FIG. 6).

Flow Path of Cooling Air

A flow path of cooling air for cooling the light source lamp 50 is now discussed. In the following explanation, it is assumed that the projector 1 is installed in the normal position.

Figure 8:
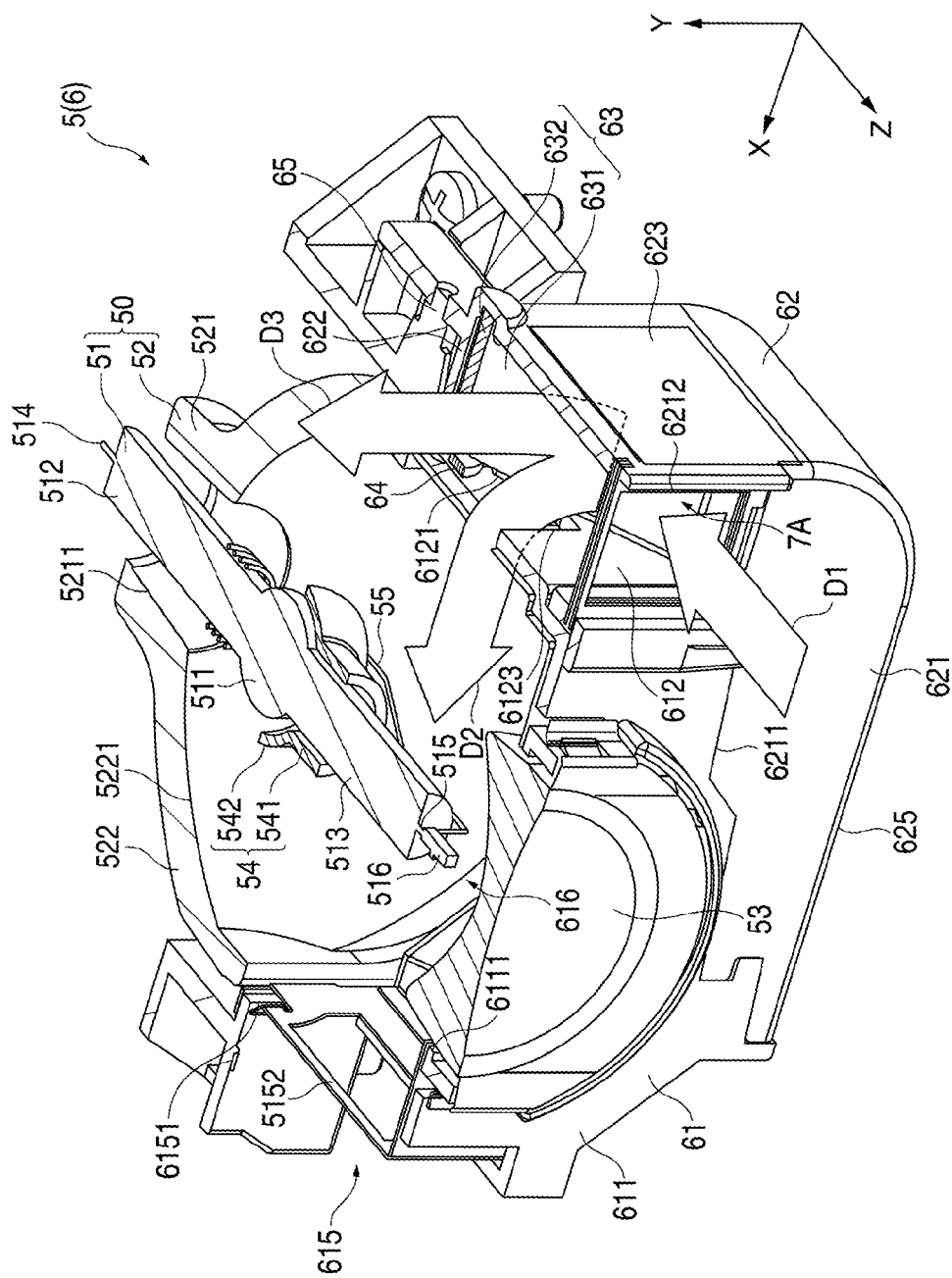
FIG. 8 is a perspective view showing a flow path of cooling air for cooling the light source device according to the embodiment.
Figure 9:
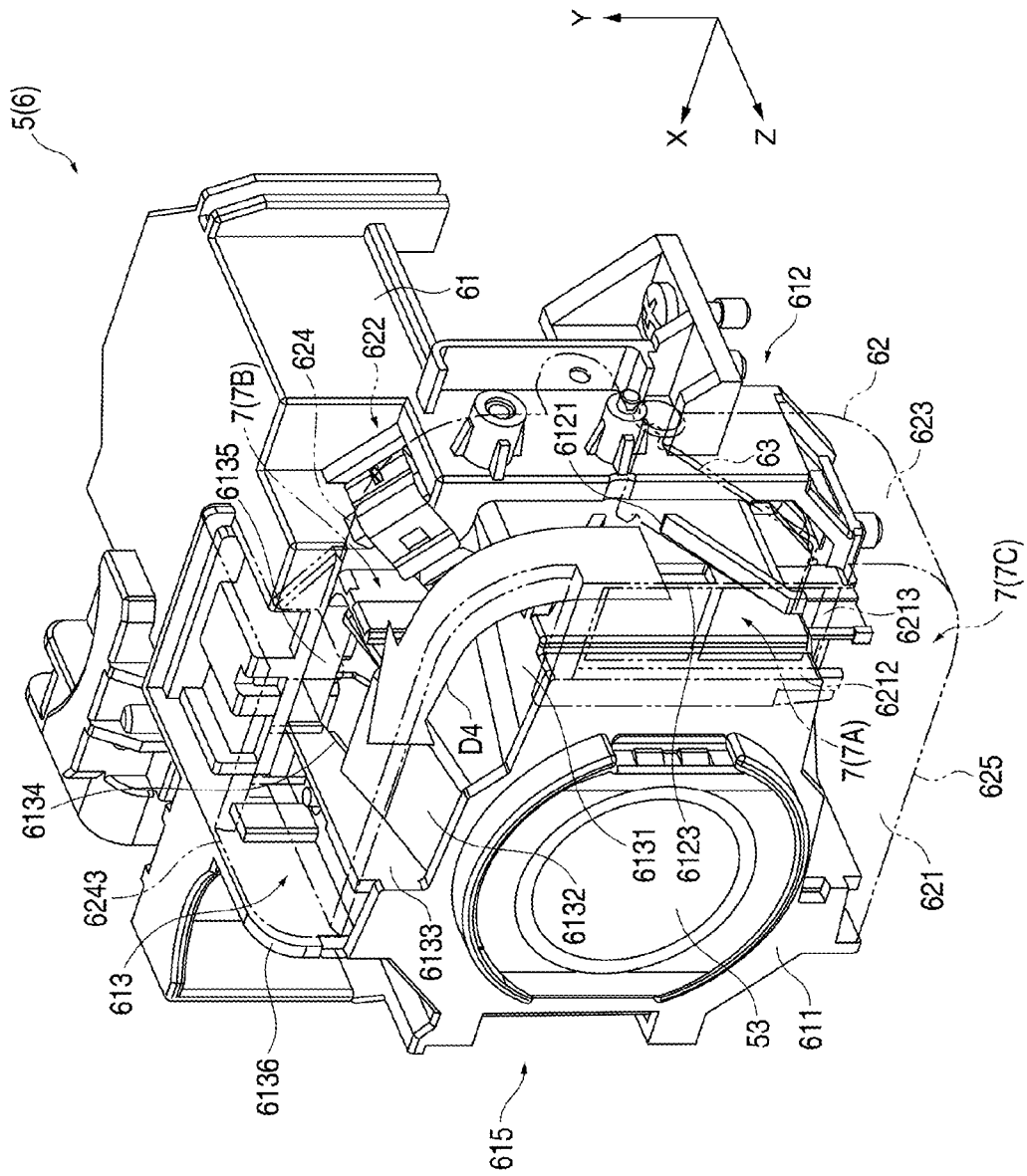
FIG. 9 is a perspective view showing a flow path of cooling air for cooling the light source device according to the embodiment.
Figure 10:
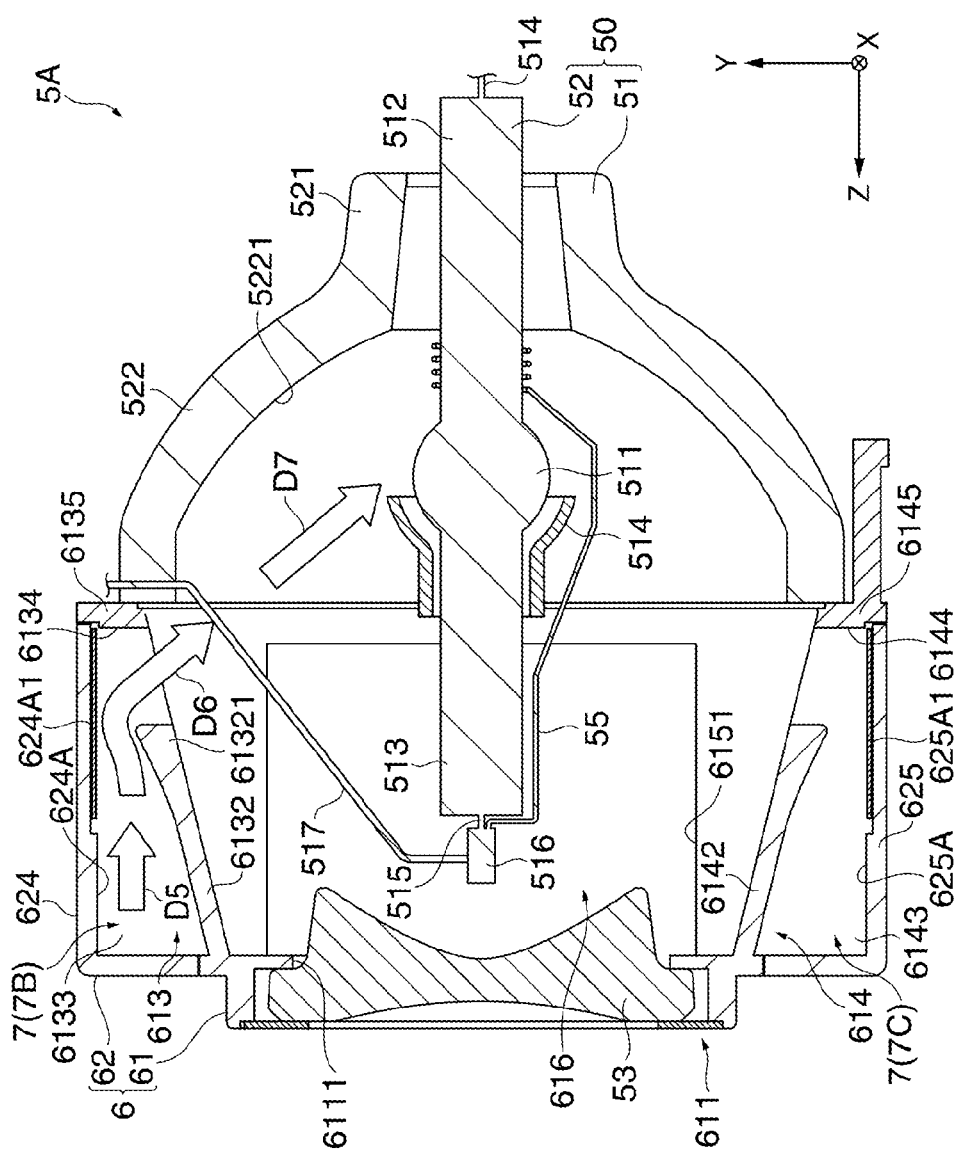
FIG. 10 is a cross-sectional view showing a flow path of cooling air for cooling the light source device according to the embodiment.

FIGS. 8 through 10 illustrate a flow path of cooling air for cooling the light source lamp 50. More specifically, FIGS. 8 and 10 are horizontal and vertical cross-sectional views showing the light source device 5 cut along horizontal and vertical planes containing the center axis of the light source lamp 50, respectively. FIG. 9 is a perspective view of the light source device 5 showing the duct member 62 by imaginary lines.

As illustrated in FIG. 8, cooling air delivered from the fan 93 advances in a direction D1, and is introduced into the branch portion 7A through the introduction port 6212. A part of the cooling air thus introduced is branched in a direction D2 (direction toward the left side in the X direction), and introduced into the lamp container 616 through the slit-shaped opening 6123 to cool the arc tube 51 on the sealing portion 513 side.

The other cooling air is branched in a direction D3 (direction toward the upper side in the Y direction) by the guiding plate 63 rotated by its weight in the vertical direction until contacting the rotation regulating members 6121 and 6231, and flows within the branch portion 7A toward the first duct portion 7B.

The cooling air flowing in the direction D3 enters into the first duct portion 7B surrounded by the upper surface 613 of the container main body 61 and the front surface 621, the back surface 622, and the upper surface 624 of the duct member 62 as illustrated in FIG. 9. Then, the cooling air flows within the first duct portion 7B toward a direction D4 (direction toward the left side in the X direction).

The flow direction of the cooling air flowing in the direction D4 is changed to a direction D5 (direction toward the side opposite to the light emission side in the Z direction) by the standing portion 6133 as illustrated in FIG. 10.

Then, the cooling air flows along the upper surface 624, the inclined portion 6132, and the standing portion 6133, and enters into the lamp container 616 through the opening 6134 by colliding with the wall portion 6135 as the final end of the first duct portion 7B. The inclined portion 6132 is inclined upward in the Y direction toward the side opposite to the light emission side in the Z direction. The curved portion 61321 curved toward the upper side in the Y direction is provided at the end of the inclined portion 6132 on the side opposite to the light emission side in the Z direction. Moreover, the wall portion 6135 forming the edge of the opening 6134 is a wall extending in the direction perpendicular to an inner surface 624A (surface 624A opposed to the upper surface 613 of the container main body 61) of the upper surface 624. Thus, the flowing direction of the cooling air flowing along the inclined portion 6132 is linearly changed to a direction D6, that is, toward the upper region of the light emission portion 511 by the inclined portion 6132, the curved portion 61321, the inner surface 624A, and the wall portion 6135.

The cooling air flowing in the direction D6 advances in a direction D7 in the same direction as the direction D6 to reach the upper region of the light emission portion 511 located in the direction D7. Since the opening end of the main reflection mirror 52 (edge of the reflection portion 522 on the light emission side in the Z direction) contacts the end surface of the wall portion 6135 on the side opposite to the light emission side in the Z direction, the cooling air can be supplied to the upper region of the light emission portion 511 without changing the traveling direction of the cooling air introduced through the opening 6134 into the lamp container 616. Thus, the cooling air flowing through the first duct portion 7B is directly supplied to the upper region of the light emission portion 511 without flowing along the reflection surface 5221 of the main reflection mirror 52. Accordingly, the cooling air can effectively cool the upper region of the light emission portion 511.

The cooling air having cooled the light emission portion 511 discussed above and the cooling air having entered through the opening 6123 at the branch portion 7A to cool the sealing portion 513 are both attracted by the fan 94 through the opening 6151 formed on the left side surface 615 on the side opposite to the opening 6123 and discharged to the outside of the container 6.

When the light source device 5 is reversely positioned in the up-down direction, that is, when the projector 1 is installed in the suspended position, the rotation direction of the guiding plate 63 is reversed. As a result, the cooling air branched by the branch portion 7A flows within the second duct portion 7C. Since the second duct portion 7C has a structure similar to that of the first duct portion 7B, the cooling air flowing within the second duct portion 7C is supplied to the upper region of the light emission portion 511 to effectively cool the upper region even in the suspended position.

Figure 11:
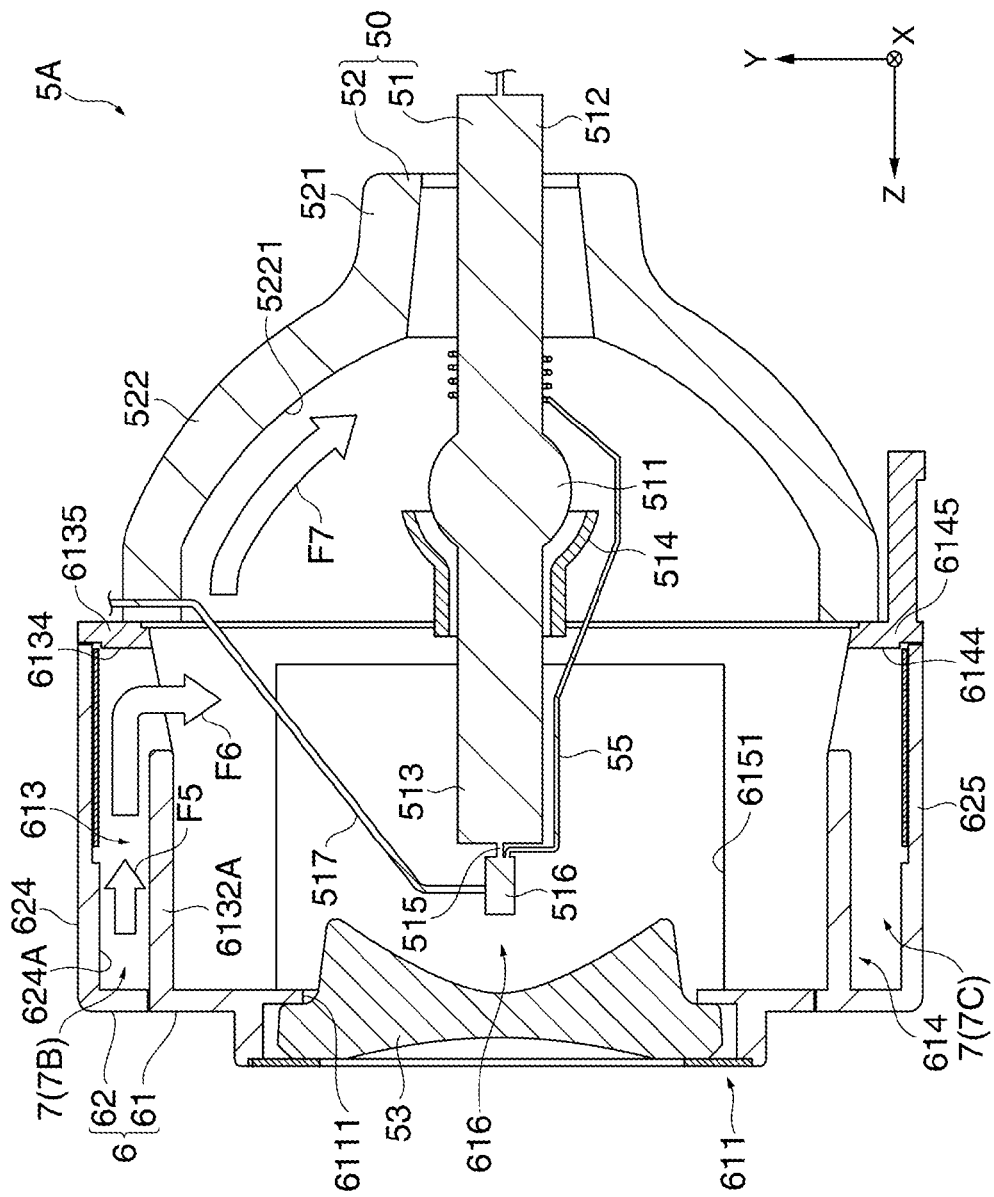
FIG. 11 is a cross-sectional view of a light source device according to a comparison example of the embodiment.

FIG. 11 is a cross-sectional view illustrating a light source device 5A as a comparison example of this embodiment. More specifically, FIG. 11 is a vertical cross-sectional view showing the light source device 5A including a flat portion 6132A in place of the inclined portion 6132.

A flow path of cooling air in a structure not including the inclined portion 6132 is now discussed. The light source device 5A explained herein has a structure similar to that of the light source device 5 except that the flat portion 6132A extending in the Z direction and X direction is provided in place of the inclined portion 6132. Identical reference numbers are given to parts identical or similar to those described above, and the same explanation is not repeated.

Cooling air flowing within the first duct portion 7B of the light source device 5A flows in a direction F5 (direction toward the side opposite to the light emission side in the Z direction) along the upper surface 624, the flat portion 6132A and the standing portion 5133. Since the flat portion 6132A has a flat surface extending in the Z direction as well as in the direction of the opposed inner surface 624A, the cooling air flows along the wall portion 6135 in a direction F6 to enter into the lamp container 616 through the opening 6134.

The cooling air having entered the lamp container 616 is diffused within the lamp container 616. A part of the cooling air flows in a direction F7 along the reflection surface 5221 of the main reflection mirror 52. This cooling air flows toward the area between the reflection surface 5221 and the light emission portion 511, and only a part of this cooling air is supplied to the upper region of the light emission portion 511. Thus, the flow amount and wind pressure of the cooling air supplied to the upper region of the light emission portion 511 are lower than those of the light source device 5 having the inclined portion 6132, and the efficiency for cooling the upper region lowers.

The projector 1 according to this embodiment described above offers the following advantages.

Cooling air flowing within the first duct portion 7B flows with inclination toward the inner surface 624A opposed to the upper surface 613 having the opening 6134. Thus, the cooling air advances toward the light emission portion 511 through the opening 6134 with the flowing direction changed by the inclined portion 6132, the inner surface 624A, and the wall portion 6135. By this method, the cooling air can be linearly supplied from the opening 6134 toward the upper region of the light emission portion 511 without reaching the sub reflection mirror 54. Thus, the upper region of the light emission portion 511 can be effectively cooled. Since the curved portion 61321 curved toward the upper side in the Y direction is provided on the inclined portion 6132 on the side opposite to the light emission side in the Z direction, the cooling air can be supplied to the upper region of the light emission portion 511 with further inclination.

When cooling air is supplied to the light source device 5 from the front of the light source device 5, supply of cooling air to the upper region of the light emission portion 511 can be appropriately provided. Thus, the fan 93 for cooling the light source device 5 can be disposed at any positions regardless of the size of the projector 1. Accordingly, cooling efficiency of the light source device 5 can improve without increasing the size of the projector 1.

Since the first duct portion 7B and the second duct portion 7C having the same structure as that of the first duct portion 7B are positioned above and below the container 6, that is, above and below the arc tube 51, cooling air can be supplied to the upper region of the light emission portion 511 either in the normal position or the suspended position. Thus, the upper region of the light emission portion 511 can be positively cooled, and the temperature difference between the upper region and the lower region of the light emission portion 511 can be reduced. Accordingly, deterioration of the arc tube 51 can be further prevented.

The opening end of the main reflection mirror 52 contacts the end surface of the wall portion 6135 on the side opposite to the light emission side in the Z direction. In this case, the opening 6134 whose edge is formed by the wall portion 6135 and the opening end of the main reflection mirror 52 are positioned close to each other. Thus, cooling air can be supplied to the upper region of the light emission portion 511 linearly from a short distance compared with a structure in which the wall portion 6135 and the opening end of the main reflection mirror 52 are positioned away from each other. Accordingly, cooling air can be securely supplied to the upper region of the light emission portion 511, and efficiency for cooling the upper region can be increased.

A part of the cooling air guided to the branch portion 7A is introduced into the lamp container 616 through the opening 6123 to cool the arc tube 51 on the sealing portion 513 side. In this case, the entire area of the arc tube 51 can be cooled by this cooling air thus introduced together with the cooling air flowing within the first duct portion 7B or the second duct portion 7C. Thus, efficiency for cooling the arc tube 51 improves, and the life of the arc tube 51 increases.

The sub reflection mirror 54 for covering the light emission portion 511 on the sealing portion 513 side is provided on the arc tube 51. Thus, a part of light not directly reaching the main reflection mirror 52 can be directed to the main reflection mirror 52 by the sub reflection mirror 54. Thus, use efficiency of light emitted from the light emission portion 511 improves.

As explained above, cooling air can be linearly supplied to the upper region of the light emission portion 511 even in the structure including the sub reflection mirror 54. Thus, cooling air can appropriately cool the upper region of the light emission portion 511 without reaching the sub reflection mirror 54.

Since the guiding plate 63 rotatable by its weight is provided within the branch portion 7A, cooling air can be supplied to the first duct portion 7B or the second duct portion 7C positioned above the arc tube 51 by the function of the guiding plate 63. Thus, the upper region of the light emission portion 511 can be appropriately cooled by the cooling air supplied to the upper region either in the normal position or the suspended position.

Modified Example

The invention is not limited to the embodiment described above, and it is therefore intended that changes and improvements may be made without departing from the scope and spirit of the invention.

According to the embodiment, the curved portion 61321 curved toward the upper side in the Y direction is formed on the inclined portion 6132 on the side opposite to the light emission side in the Z direction. However, the curved portion 61321 may be eliminated, for example. The flat portion 6132A may have an inclined portion curved toward the upper side in the Y direction in the vicinity of the opening 6134 on the side opposite to the light emission side in the Z direction. In this case, this inclined portion corresponds to an inclined portion in the appended claims. This applies to the inclined portion 6142 as well.

According to the embodiment, the wall portion 6135 is a wall extending in the direction perpendicular to the inner surface 624A of the upper surface 624. However, the angle of the wall portion 6135 with respect to the inner surface 624A may be arbitrarily determined as long as cooling air flowing within the first duct portion 7B can be supplied to the upper region of the light emission portion 511. This applies to the wall portion 6145 as well.

According to the embodiment, the opening end of the main reflection mirror 52 contacts the wall portion 6135 on the side opposite to the light emission side in the Z direction. However, the opening 6134 whose edge is formed by the wall portion 6135 and the opening end of the main reflection mirror 52 may be disposed away from each other. This applies to the opening 6144 and the wall portion 6145 as well.

According to the embodiment, the arc tube 51 includes the substantially spherical light emission portion 511 and the pair of the sealing portions 512 and 513 extending in the direction away from each other from both ends of the light emission portion 511. However, it is only required that a light emission portion and a sealing portion extending from one end of the light emission portion are provided. The sub reflection mirror 54 may be eliminated.

According to the embodiment, the guiding plate 63 rotates by its weight around the extending portion 632 as its rotation axis to guide a part of cooling air introduced into the branch portion 7A toward the first duct portion 7B or the second duct portion 7C. However, such a guiding member may be provided which shifts by its weight to block the flow path for the first duct portion or the second duct portion positioned below and supply cooling air for the duct portion positioned above, for example.

According to the embodiment, the light source device 5 includes the branch portion 7A containing the guiding plate 63, the first duct portion 7B, and the second duct portion 7C. However, the second duct portion 7C and the guiding plate 63 may be eliminated when the projector 1 is not installed in the suspended position, for example.

According to the embodiment, the projector 1 includes the three liquid crystal panels 442R, 442G, and 442B. However, the invention is applicable to a projector including two or a smaller number of liquid crystal panels, or four or a larger number of liquid crystal panels.

According to the embodiment, the optical unit 4 has substantially L shape in the plan view. However, the optical unit 4 may have substantially U shape in the plan view, for example.

According to the embodiment, the transmission type liquid crystal panels 442 using different surfaces for light entrance and light exit are included. However, reflection type liquid crystal panels using the same surface for light entrance and light exit may be employed.

While the projector 1 including the liquid crystal panels 442 as light modulation devices has been discussed, other types of light modulation devices may be used as long as they can modulate received lights according to image information to form optical images. For example, the invention is applicable to a projector using a light modulation device other than liquid crystal type light modulation device such as a device including micromirror. In this case, the polarization plates 443 and 445 on the light entrance side and light exit side can be eliminated.

While the light source device 5 included in the projector 1 has been discussed, the light source device 5 may be included in a lighting device such as a desk lamp.

Accordingly, the invention is applicable to a light source device, and particularly appropriate for a light source device included in a projector.

The entire disclosure of Japanese Patent Application No. 2008-276913, filed Oct. 28, 2008 is expressly incorporated by reference herein.

What is claimed is:

1. A light source device comprising:
an arc tube having a light emission portion and a first sealing portion extending from one end of the light emission portion;
a first reflection mirror attached to the first sealing portion and having a substantially concave surface for reflecting a light emitted from the light emission portion; and
a container which accommodates the arc tube and the first reflection mirror,
wherein:
the container has a duct unit disposed above the arc tube and extending along a center axis of light reflected by a reflection surface such that a cooling air can flow in a direction opposite to a traveling direction of the light reflected by the reflection surface, and
the duct unit includes:
a first opening open to the arc tube and disposed at a position shifted toward a traveling direction side from an opening end of the first reflection mirror,
a wall portion which forms an edge of the first opening on a side opposite to the traveling direction side as a final end of the duct unit, and
an inclined portion disposed in the vicinity of the edge of the first opening on the traveling direction side to bend a flowing direction of the cooling air toward an upper surface opposite to the surface having the first opening, the inclined portion extending away from the first opening in a sloping direction that is obliquely in the traveling direction and toward the center axis of the light reflected by the reflection surface,
the upper surface extends over the first opening;
a metal plate-shaped member is attached to the upper surface over the first opening such that the cooling air bent by the inclined portion is reflected by the metal plate-shaped member toward the light emission portion.

2. The light source device according to claim 1, wherein the opening end of the first reflection mirror contacts an end surface of the wall portion on the side opposite to the traveling direction side.

3. The light source device according to claim 1, wherein:
the arc tube has a second sealing portion extending from the end of the light emission portion opposite to the end from which the first sealing portion extends; and
the duct unit includes a branch portion having a second opening which branches a part of the cooling air flowing within the duct unit to guide the part of the cooling air to the second sealing portion.

4. The light source device according to claim 1, wherein the arc tube has a second reflection mirror which covers the light emission portion on the light traveling direction side and reflects a received light toward the first reflection mirror.

5. The light source device according to claim 1, wherein the duct unit includes:
- a first duct portion and a second duct portion disposed opposed to each other with a center of the arc tube interposed between the first and second duct portions, each of the first and second duct portions has a first opening, a wall portion, and an inclined portion; and
- a guiding member which directs the cooling air toward the first duct portion or the second duct portion positioned above the arc tube by moving by its own weight.

6. The light source device according to claim 1, wherein the metal plate-shaped member extends in a direction substantially parallel to the center axis of the light reflected by the reflection surface.

7. A projector comprising:
- the light source device according to claim 1;
- a light modulation device which modulates the light emitted from the light source device and forms an image light; and
- a projection device which projects the image light.

8. The projector according to claim 7, wherein the opening end of the first reflection mirror contacts an end surface of the wall portion on the side opposite to the traveling direction side.

9. The projector according to claim 7, wherein:
- the arc tube has a second sealing portion extending from the end of the light emission portion opposite to the end from which the first sealing portion extends; and
- the duct unit includes a branch portion having a second opening which branches a part of the cooling air flowing within the duct unit to guide the part of the cooling air to the second sealing portion.

10. The projector according to claim 7, wherein the arc tube has a second reflection mirror which covers the light emission portion on the light traveling direction side and reflects a received light toward the first reflection mirror.

11. The projector according to claim 7, wherein the duct unit includes:
- a first duct portion and a second duct portion disposed opposed to each other with a center of the arc tube interposed between the first and second duct portions, each of the first and second duct portions has a first opening, a wall portion, and an inclined portion; and
- a guiding member which directs the cooling air toward the first duct portion or the second duct portion positioned above the arc tube by moving by its own weight.

* * * * *